No. 749,151. PATENTED JAN. 12, 1904.
T. W. BARBER.
VARIABLE SPEED GEAR.
APPLICATION FILED DEC. 13, 1902.
NO MODEL. 5 SHEETS—SHEET 1.

Fig. 2.

No. 749,151. PATENTED JAN. 12, 1904.
T. W. BARBER.
VARIABLE SPEED GEAR.
APPLICATION FILED DEC. 13, 1902.
NO MODEL. 5 SHEETS—SHEET 4.

No. 749,151. Patented January 12, 1904.

UNITED STATES PATENT OFFICE.

THOMAS W. BARBER, OF LONDON, ENGLAND.

VARIABLE-SPEED GEAR.

SPECIFICATION forming part of Letters Patent No. 749,151, dated January 12, 1904.

Application filed December 13, 1902. Serial No. 135,072. (No model.)

*To all whom it may concern:*

Be it known that I, THOMAS WALTER BARBER, a subject of the King of England, residing at London, England, have invented certain new and useful Improvements in or Relating to Variable-Speed Gear, of which the following is a specification.

This invention relates to improvements in or relating to speed-gear suitable for motor-vehicles, winches, or other purposes, and has for its object to provide a gear which will give any speed up to its maximum. A reversing mechanism is also provided and applied in such a manner to the gear that the same speeds may be obtained in the reverse direction as in the driving direction.

In speed-gear constructed according to one method of carrying out this invention the driving and driven shafts are mounted in axial line. A variable-throw eccentric is mounted on or connected with the driving-shaft and surrounding it is a strap carrying one or more pawls adapted to engage a disk or annular member on the driven shaft. Means are provided by which rotation of the strap is prevented, so that the movement imparted to it by the eccentric reciprocates the pawls upon that portion of the disk or annular member with which they are in contact, so that they alternately engage and release the member on the driven shaft. By this means continuous movement is imparted to the driven member in one direction and by varying the throw of the eccentric on the driving-shaft the amount of movement imparted to the driven member at each operation of the pawls may be increased or decreased for varying the speed. The direction of rotation of the driven shaft may be reversed by mounting the driven member free on the shaft and interposing gearing between it and a sleeve mounted concentrically with the shaft, so that by means of a suitable clutch the driven shaft may be connected either to the driven member direct or to the sleeve, with the gearing interposed.

In place of preventing the strap of the eccentric from rotating a second set of pawls may be provided, operating in the reverse direction to those which engage the driven member and adapted to engage a stationary member, so that the strap is made to rotate in the same direction as the driven member and increases the amount of movement imparted to the driven member.

Various means may be provided for adjusting the throw of the eccentric. According to one method the eccentric is provided with a slot which receives one end of the driving-shaft, and links pivotally connect the eccentric with this end of the shaft. Means are provided for moving the shaft in an endwise direction through the eccentric, and the eccentric being prevented from endwise movement by suitable means is thrown out farther from or drawn toward the center of the shaft by the connecting-links, according to the direction in which the shaft is moved.

In the accompanying drawings, which illustrate one method of carrying out this invention.

Like letters indicate like parts throughout the drawings.

The gear is carried at its center by an annular frame $A'$, secured to a main-frame member $A$, and is supported at its ends by the driving and driven shafts $B$ and $C$, respectively, each of which is carried in suitable bearings. (Not shown in the drawings.) The frame member $A$ is provided with lugs $A^*$ for securing it to any suitable part of the mechanism with which it is desired to employ the gear. The annular frame $A'$ is provided with a central flange or web $A^2$, on either side of which are mounted disks $B'$ $C'$, respectively, each provided with an annular peripheral flange $B^2$ $C^2$, so that they form dished members $B'$ $B^2$ and $C'$ $C^2$, respectively. The flanges $B^2$ $C^2$ face each other and being in contact with the frame A' form, with the disks, a chamber within which the gear is mounted, as hereinafter described.

Figure 2:
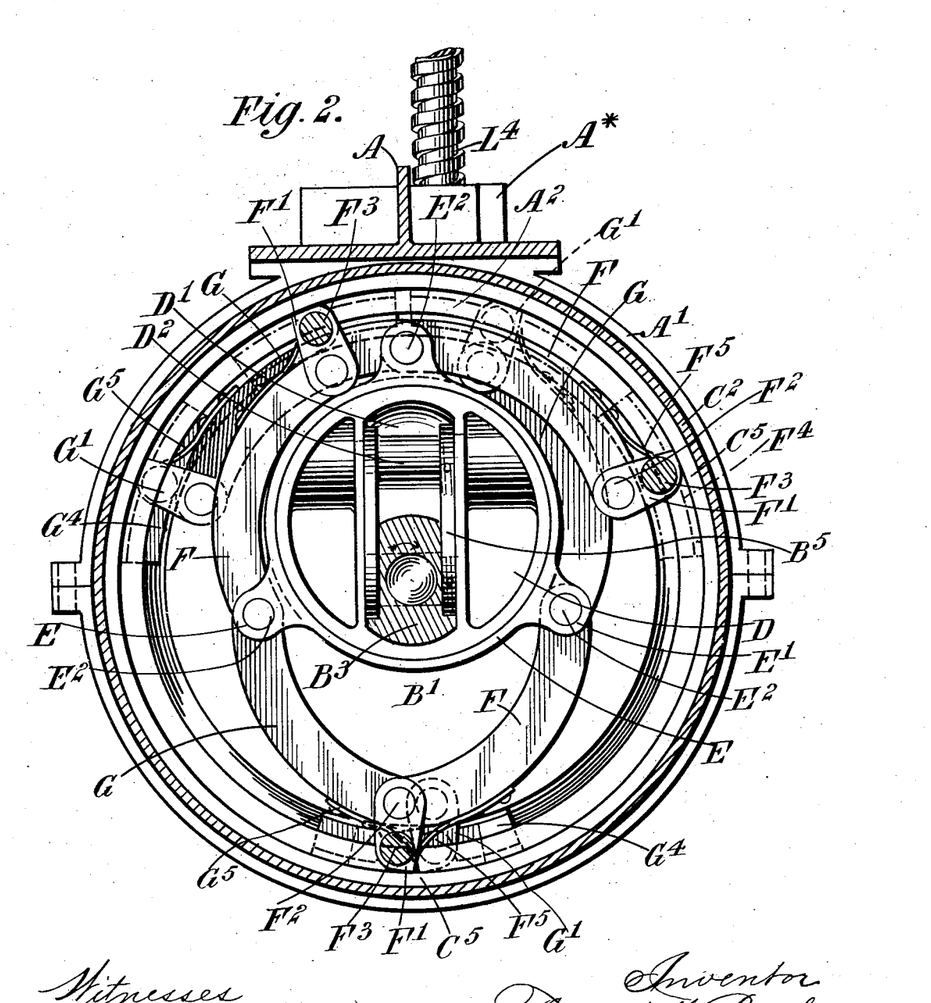
Fig. 2 is a section taken transversely to the shafts on the line 2 2 of Fig. 1.
Figure 3:
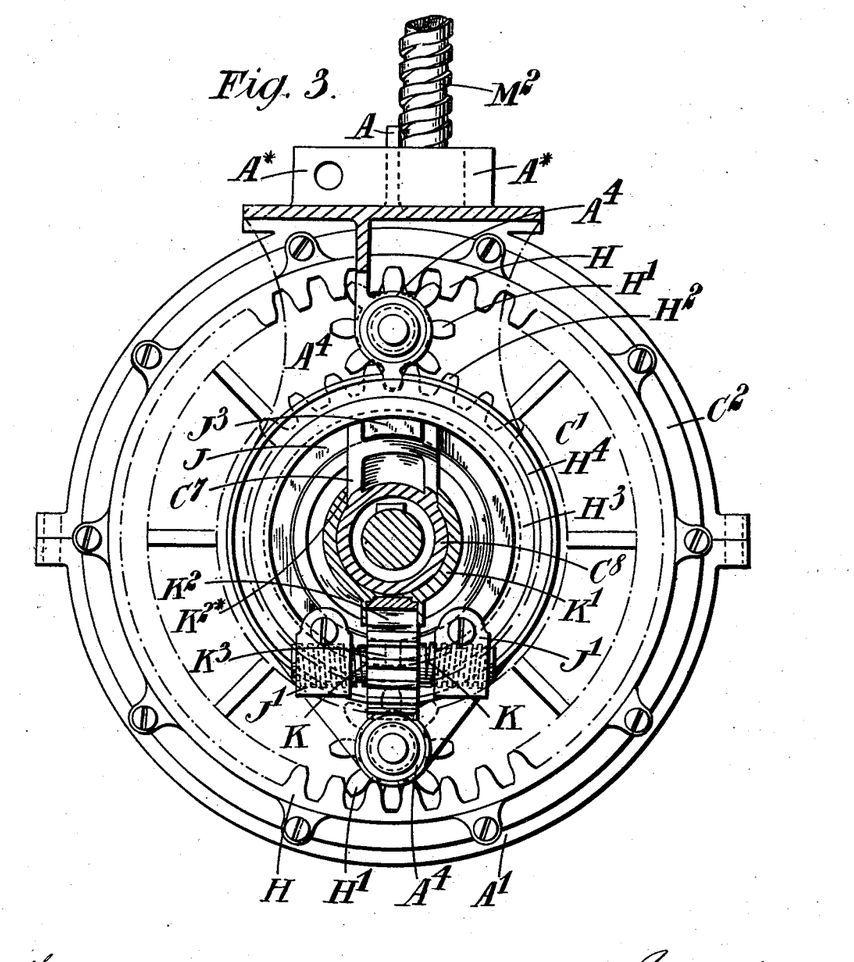
Fig. 3 is an end view of the reversing mechanism, a part being broken away for the sake of clearness.

The members B' C' are supported at their edges by the frame A' and at their centers by the shafts B and C, which pass through them. The member B' is a stationary member and is secured at its flange B² to the frame A'; but the member C' is free to rotate and is provided with a peripheral lip C³, which engages an annular groove A³ in the frame A'. The annular member C' C² is thus held in place by and is free to rotate in the surrounding portion of the frame A', and the latter is made in two parts, as shown in Figs. 2 and 3, to permit the insertion of the lip C³ in place.

The driving-shaft B is provided with a sliding sleeve B³, interposed between the disk B' and the shaft. The sleeve projects through the disk into the space between the disks B' C', and although free to slide upon the shaft B is compelled to rotate with it by means of a feather B⁴ in the well-known manner.

In the space between the disks B' C' is mounted an eccentric D, provided with a central slot D', through which the end of the sleeve B³ projects. Pivoted on either side of the end of the sleeve B³ are links B⁵, the free ends of which are pivotally connected to the eccentric by a pin D² at one end of the slot D'.

Figure 5:
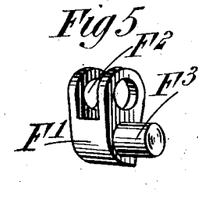
Fig. 5 is a perspective view of one of the driving-pawls of the speed-gear.
Figure 6:
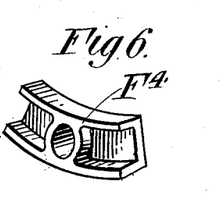
Fig. 6 is a perspective view of a detail of the apparatus.

Surrounding the eccentric D is a strap E, having ears or lugs E'. The lugs E' are arranged in sets of three opposite each other and disposed at three different points on the periphery of the strap, preferably equidistant from each other. Each set of three lugs thus arranged forms two jaws between them adapted to receive the ends of arms pivoted to the lugs by pins E², and one of the jaws of each set lies within the annular member C' C² and the other within the member B' B². In the jaws which lie in the member C' C² arms F are pivoted, which extend forward within the annular member C' C² in the same direction as shown in Fig. 2. To the free ends of the arms F are pivoted pawls F', the construction of which is shown in detail in Fig. 5. Each pawl is provided with a jaw F² to receive the end of the arm F and carries a pin F³ on that side which lies against the dish-shaped member C' C². The pin F³ is placed near the free end of the pawl and is received by a sliding piece or shoe F⁴ (shown in detail in Fig. 6) and adapted to slide in an annular groove C⁴, formed in the face of the disk C'. A spring F⁵ is mounted on the free end of each of the arms F and bears against the free end of the pawl F³, so that the engaging end of the pawl is always kept in contact with the flange C² of the member C' or a hardened lining C⁵ on the flange.

In the jaws, which lie within the dished member B', arms G are pivoted, similar to the arms F, but facing in the opposite direction, and to the free ends of these arms are pivoted pawls G', having a jaw similar to the jaw F² on the pawls F', to receive the arms and a pin G³, engaging a shoe G⁴, all of which parts correspond to those of the arms F. The shoes G⁴ slide in an annular groove B⁶ in the face of the disk B'. Springs G⁵ are also provided to maintain the pawls G' in contact with the flange B² or its liner B⁷ of the dished member B'.

The operation of this device is as follows: Presuming the driving-shaft to be rotated in the direction indicated by the arrow in Fig. 2, the sleeve B³ will of course rotate in the same direction, carrying with it by means of the links B⁵ the eccentric D. As the eccentric rotates the strap, presuming it cannot rotate, will descend, so that the free end of the arm F on the lower right-hand side of Fig. 2 will be made to travel to the left of the figure, advancing its pawl along the flange C² of the member C'. Still presuming the strap not to rotate, the eccentric having completed half a revolution will now begin to raise the strap, so that the arm F, before referred to, will now be pulled upon in the opposite direction. The pawl at the free end of the arm turning now, however, upon its pin as a fulcrum grips the face of the flange C² of the dished member C', so that this member being free to rotate travels round with the arm until the strap E has again reached the position shown in Fig. 2. It will be seen that this operation may be continuously repeated with the arm referred to and that both of the other arms F also act in turn, so that continuous movement is imparted to the member C' so long as the strap E is itself prevented from rotation. To prevent the strap from rotating, it may, if desired, be carried by a plate upon which it is free to slide in a vertical direction, the plate itself being free to slide on the face of the dished member B' in a horizontal direction, such a device being commonly used where it is desired to allow a member to gyrate, but prevent it from rotation. In this apparatus, however, it is preferred to rotate the strap in the opposite direction to that in which it would naturally rotate when the arms F engage the member C', and for this purpose the second set of arms G is provided. These arms, as described above, face in the opposite direction to the arms F, but are operated by the gyrating movement of the strap in exactly the same manner as the arms F, with the exception that as the annular member B' B² is stationary the strap E is caused to rotate in place of the member. By the rotation of the strap double the amount of movement given by the arms F is imparted to the member C', although, as described, this second set of arms, with their pawls, may be dispensed with, if desired.

Figure 1:
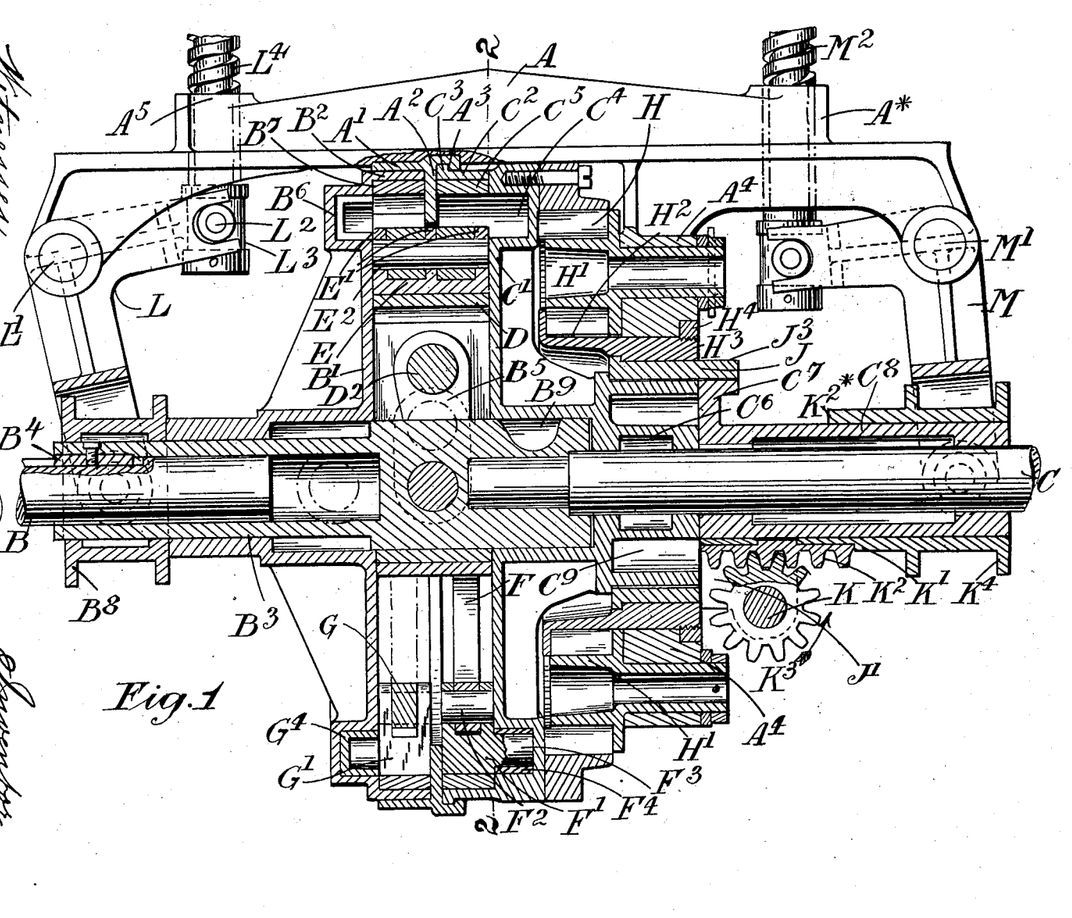
Figure 1 is a central section of the gear in the longitudinal direction of the driving and driven shafts.

To vary the speed at which the member C' is driven, the sleeve B³ on the driven shaft is moved in one direction or the other, so that the links B⁵ are made to pull upon the eccentric D, drawing it toward a position concentric with the shaft D or pushing it from this position, so that it becomes eccentric to the shaft. The position of greatest eccentricity is shown in Figs. 1 and 2, where the links $B^5$ are at right angles to the shaft; but it will be easily understood that as the sleeve $B^3$ is withdrawn from the member $B'$ the links $B^5$ are gradually inclined until they are brought into the position shown in chain-lines. In this position the centers of the eccentric D and the driving-shaft B coincide, so that the strap E is not moved by the eccentric, and the shaft B runs without imparting movement to the member $C'$. The sleeve $B^3$ is recessed at $B^9$ to receive the pin $D^2$ when the eccentric is in its central position, and the sides of the sleeve are cut away to allow free movement of the links $B^5$.

Any convenient device may be provided for securing the member $C'$ either directly or indirectly to the driven shaft C. It will also be seen that many devices other than the groove $B^6$ or $C^4$ may be employed to constrain the pawls in a path concentric with the disks or annular members and to provide a fulcrum upon which they turn.

Figure 4:
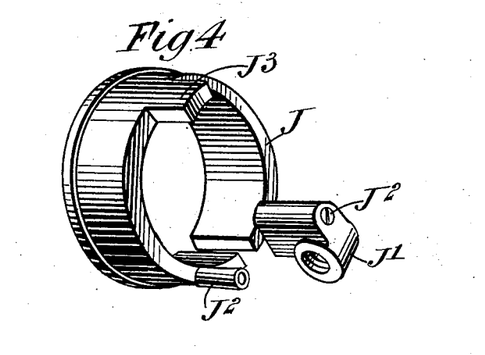
Fig. 4 is a perspective view of a clutch-ring employed for reversing.

For the purpose of reversing, according to one method, toothed gearing is introduced and a clutch by which the member $C'$ may either be secured directly to the shaft C or connected with it through the gearing. The gearing comprises an internally-toothed ring H, made fast to the member $C'$ and gearing with pinions $H'$, carried in bearings in a hanger $A^4$, made integral with or secured to the frame member A. Gearing with the pinions $H'$ is an annular spur-wheel $H^2$, provided with an extension or boss $H^3$, by which it is carried in a suitable bearing in the bracket $A^4$ between the pinions $H'$. To prevent the extension $N^3$ from being withdrawn from the bearing, a collar $H^4$ is screwed on its free end and bears against a recessed portion of the bearing in the bracket $A^4$. The disk $C'$ is provided with a boss $C^6$, by which it is carried on the shaft C, and between this sleeve or boss and the interior of the boss $H^3$ of the toothed wheel $H^2$ is mounted a split ring J. (Shown in detail in Fig. 4.) The ends of the split ring are connected by a right and left handed screw-threaded spindle K, operating in lugs $J'$, carried by pins $J^2$, secured to the ring, and the ring is connected by a lug $J^3$ to an arm $C^7$, fast on a sleeve $C^8$, keyed to the driven shaft C. Free to slide on the sleeve $C^8$ is a sleeve $K'$, carrying a rack $K^2$, which engages a pinion $K^3$, fast on the screw-spindle K, by which the two ends of the split ring are connected. The sleeve $K'$ is cut away at $K^2$ to allow the arm $C^7$ of the sleeve $C^8$ to project and to permit endwise movement of the sleeve $K'$. The operation of this reversing mechanism is as follows: If the sleeve $K'$ is moved toward the left of Fig. 1, the pinion $K^3$ will be rotated in the direction indicated by the arrow and the ends of the split ring J drawn together, so that the ring will be firmly contracted upon the extension of the boss $C^6$ of the member $C'$. The member $C'$ is thus directly connected with the driven shaft C, so that this shaft may be driven in the same direction as the shaft B at a speed which varies according to the amount of eccentricity given to the eccentric D. The boss $C^6$ of the disk $C'$ is recessed at $C^9$ to receive the end of the sleeve $K'$ when moved in the direction described. If now the sleeve $K'$ is moved in the opposite direction, the driven shaft is first freed from its connection with the driving-shaft, and if the movement of the sleeve is continued the split ring is made to bear against the interior surface of the boss $H^3$ of the toothed wheel $H^2$. The wheel $H^2$ is continuously rotated so long as the member $C'$ is in movement, but in a reverse direction from this member, through the interposition of the pinions $H'$. As soon, therefore, as the split ring J is brought into engagement with the toothed wheel $H^2$ the shaft C, with which the ring is connected by the arm $C^7$ and sleeve $C^8$, is rotated in a reverse direction to the driving-shaft B. It will be seen, therefore, that by means of this mechanism the driven shaft may be rotated in either direction at any speed within the limits of the gear.

To give endwise movement to the sleeves $B^3$ $K'$, any convenient mechanism may be employed, that shown in the drawings for the sleeve $B^3$ comprising a clutch-ring $B^8$, engaged by a forked arm L, pivoted at $L'$ to the frame member A. The free end of the arm L is formed to engage a pin $L^2$ in a sleeve $L^3$, carried at the end of a "quick-threaded" screw-spindle $L^4$. The spindle $L^4$ is carried in a screw-threaded lug $A^5$ on the frame member A and may be rotated by any convenient means. As the spindle $L^4$ is rotated in one direction or the other the end of the arm L in engagement with it will be raised or lowered, so that the sleeve $B^3$ is moved endwise toward or away from the eccentric D. The free end of the sleeve $B^3$ is conveniently hollowed to receive the free end of the driven shaft C, so that the sleeve serves as a strengthening-link between the two shafts. The sleeve $K'$ is operated in the same manner as the sleeve $B^3$, being provided with a clutch-ring $K^4$, an operating-arm M, pivoted at $M'$ to the frame member A and rocked by a quick-threaded screw-spindle $M^2$.

Figure 7:
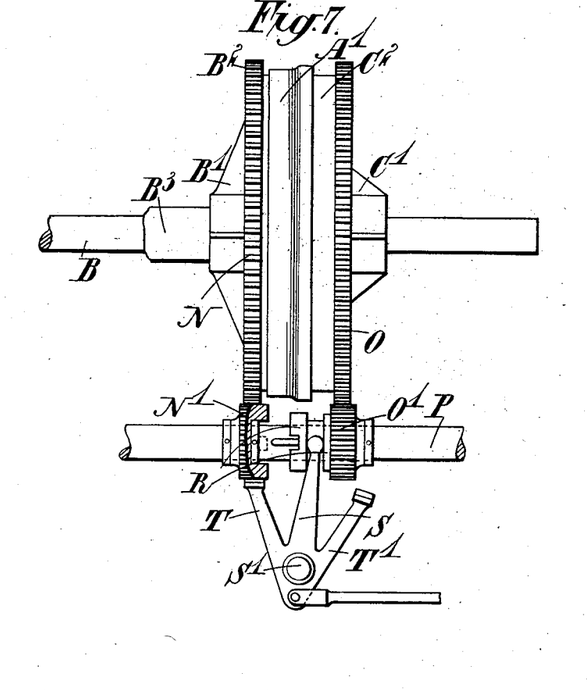
Fig. 7 is an elevation of a modified form of gear.

In place of the reversing mechanism described above the annular members $B'$ $B^2$ $C'$ $C^2$ may be both adapted to rotate, so that driving may be effected from either member, according to the direction in which the driven shaft is desired to rotate. Such an arrangement is shown in Fig. 7, in which the annular frame $A'$ is secured to the annular member $B'$ $B^2$, but is free of the frame of the gear, so that it may rotate with the member by which it is carried. The frame member A' serves in this case merely to keep the members B' B² C' C² together and, if desired, may be dispensed with. Each member B' B² C' C² is provided at its peripheral edge with teeth N O, respectively. Parallel with the shafts B and C is mounted a driven shaft P, carried by suitable bearings. (Not shown in the drawings.) Free on the shaft P are mounted pinions N' O', respectively, gearing the former with the teeth on the member B' B² and the latter with those of the member C' C². Between the pinions N' O' is a jaw-clutch R, free to slide on the shaft P and adapted to engage either the pinion N' or O' with the shaft, according to the position of the clutch. Engaging the clutch is an arm S, pivoted at S' to any convenient part of the frame of the gear and adapted to be operated by any convenient means to move the clutch into engagement with either of the pinions. Secured also to the arm S are pawl-arms T T', adapted to engage the teeth of the pinion not engaged by the clutch. The operation of this reversing-gear is as follows: If the members B' B² C' C² are left free and the shaft B' rotated, one member will travel in one direction while the other member rotates in the opposite direction. If, therefore, pinions are geared to these members, as described, driving may be effected in either direction according to the pinion engaged by the shaft, while the pinion not engaged is prevented from rotation, resulting in the member with which it meshes also being held stationary by the pawl-arm T or T', according to which pinion is engaged with the clutch R. It will be understood that with this form of mechanism the shaft C is not used for driving purposes, but only constitutes a support for the members C' C² and may be either stationary or allowed to rotate with that member. One or both of the members B' B² C' C² may be provided on their peripheries with a pulley adapted to receive a belt for transmitting power in place of transmitting it through the shaft C. The shaft C may thus be dispensed with, if preferred, so that the member driven by the pawls F' or G' becomes the driven shaft by which movement is transmitted to the mechanism the gear is intended to operate. Several sets of pawl-arms may be provided, if desired, to operate in each of the annular members, the pawls being adapted to operate on the member at different points, so that a continuous movement may be insured. Where it is desired to transmit heavy power through the gear, each pawl may be provided with a second pin corresponding to the pin F³, but on the opposite side of the pawl and adapted to operate in a groove formed on the annular frame A', so that the pawl may be supported on both sides.

Although the pawls F' G' have been described as operating within annular members B' B² C' C², it will be understood that they might operate on the peripheries of disks in place of these members and that they might engage teeth upon the members in place of the frictional engagement described. The eccentric-strap E may be carried on ball-bearings, if desired, as may other parts of the gear, and, in fact, many modifications may be made in the details of the apparatus without departing from the spirit of this invention.

It should be noted that the two annular members B' B² C' C², placed face to face in engagement with the supporting-frame A', form a dust-proof casing for the gear inclosed within them.

What I claim as my invention, and desire to secure by Letters Patent, is—

1. In a speed-gear the combination of a driving-shaft, a disk mounted coaxially therewith and adapted to be connected with the mechanism to be driven, an eccentric carried by the driving-shaft, an eccentric-strap, an engaging device operatively connected with the strap and adapted to engage the disk when moved in one direction by the strap, means for releasing the engaging device from the disk when moved in the reverse direction, means to control the movement of the engaging device in a path concentric with the disk, and means to prevent the eccentric-strap from rotating in the direction opposite to that in which driving is being effected, as set forth.

2. In a speed-gear the combination of a driving-shaft, a disk mounted coaxially therewith and adapted to be connected with the mechanism to be driven, a second disk opposed to the first, an eccentric mounted between the two disks and carried by the driving-shaft, an eccentric-strap, an engaging device operatively connected with the strap and adapted to engage one of the disks when moved in one direction by the strap, means for releasing the engaging device from the disk when moved in the reverse direction, an engaging device operatively connected with the strap and adapted to engage the second disk when moved in one direction by the strap, means for releasing this engaging device from the disk when moved in the reverse direction, means to control the movement of the engaging device in a path concentric with the disk, and means for holding one of the disks against rotation, as set forth.

3. In a speed-gear the combination of a driving-shaft, a disk mounted coaxially therewith and adapted to be connected with the mechanism to be driven, a second disk opposed to the first and also operatively connected with the mechanism to be driven, means for releasing either disk from its connection with the mechanism to be driven and holding the released disk against rotation, an eccentric mounted between the two disks and carried by the driving-shaft, an eccentric-strap, an engaging device operatively connected with the strap and adapted to engage one of the disks when moved in one direction by the strap, means for releasing the engaging device from the disk when moved in the reverse direction, a second engaging device operatively connected with the strap and adapted to engage the second disk when moved in one direction by the strap, means for releasing this second engaging device from the disk when moved in the reverse direction and means to control the movement of each engaging device in a path concentric with its disk, as set forth.

4. In a speed-gear the combination of a driving-shaft, a disk mounted coaxially therewith and adapted to be connected with the mechanism to be driven, an eccentric-sheave carried by the driving-shaft, a strap on the sheave, a link pivoted at one end to the strap, an engaging device pivoted to the free end of the link, means for operatively connecting the engaging device with the disk when the former is moved in one direction, means for releasing the engaging device from the disk when the former is moved in the opposite direction, means to control the movement of the engaging device in a path concentric with the disk and means to prevent the eccentric-strap from rotating in the direction opposite to that in which driving is being effected, as set forth.

5. In a speed-gear the combination of a driving-shaft, a disk mounted coaxially therewith and adapted to be connected with the mechanism to be driven, an eccentric-sheave carried by the driving-shaft, a strap on the sheave, a link pivoted at one end to the strap, a single-acting pawl pivoted at the free end of the link, means for operatively connecting the pawl with the disk when the former is moved in one direction, means to control the movement of the engaging device in a path concentric with the disk, and means to prevent the eccentric-strap from rotating in the direction opposite to that in which driving is being effected, as set forth.

6. In a speed-gear the combination of a driving-shaft, a disk mounted coaxially therewith, an eccentric-sheave carried by the driving-shaft, a strap on the sheave, a link pivoted at one end to the strap, a single-acting friction-pawl pivoted to the free end of the link and adapted to engage the disk, a pin on the pawl between the free end of the pawl and that part by which it is pivoted to its link, a guide to engage the pin and maintain the pawl in a path concentric with the disk and means to prevent the eccentric-strap from rotating in the direction opposite to that in which driving is being effected, as set forth.

7. In a speed-gear the combination of a driving-shaft, a disk mounted coaxially therewith and having a groove on its face concentric with its periphery, an eccentric-sheave carried by the driving-shaft, a strap on the sheave, a link pivoted at one end to the strap, a single-acting friction-pawl pivoted to the free end of the link and adapted to engage the disk, a pin on the pawl between the free end of the pawl and that part by which it is pivoted to its link the pin being adapted to engage the groove in the face of the disks and means to prevent the eccentric-strap from rotating in the direction opposite to that in which driving is being effected, as set forth.

8. In a speed-gear the combination of a driving-shaft, a disk mounted coaxially therewith and having a groove on its face concentric with its periphery, an eccentric-sheave carried by the driving-shaft, a strap on the sheave, a link pivoted at one end to the strap, a single-acting friction-pawl, pivoted to the free end of the link and adapted to engage the disk, a pin on a pawl between the free end of the pawl and that part by which it is pivoted to its link, a shoe adapted to slide in the groove in the face of the disk and to receive the pin on the pawl and means to prevent the eccentric-strap from rotating in the direction opposite to that in which driving is being effected, as set forth.

9. In a speed-gear the combination of a driving-shaft, a disk mounted coaxially therewith, a peripheral flange on the face of the disk, an eccentric-sheave carried by the driving-shaft, a strap on the sheave, a link pivoted at one end to the strap, an engaging device pivoted to the free end of the link and adapted to engage the interior wall of the peripheral flange when moved in one direction by the strap, means by which the engaging device releases the flange when moved in the opposite direction and means to prevent the eccentric-strap from rotating in the direction opposite to that in which driving is being effected, as set forth.

10. In a speed-gear the combination of a driving-shaft, a disk mounted coaxially therewith and adapted to be connected with the mechanism to be driven, a second disk opposed to the first, an eccentric-sheave mounted between the disks and carried by the driving-shaft, a strap on the sheave, a series of links pivoted at one end to the strap, an engaging device pivoted to the free end of each link, means for operatively connecting the engaging devices with one of the disks when moved in one direction by the strap, means for releasing the engaging devices when moved in the opposite direction, a second set of links pivoted to the strap, an engaging device pivoted to the free end of each of these links, means for operatively connecting this second set of engaging devices with the second disk when the former are moved in the opposite direction to that employed to engage the first set, means for releasing this second set of engaging devices when moved in the opposite direction, means to control the movements of the engaging devices in paths concentric with the disks, and means for securing one of the disks against rotation, as set forth.

11. In a speed-gear the combination of a driving-shaft, a disk mounted coaxially therewith, a second disk opposed to the first, an eccentric mounted between the two disks and carried by the driving-shaft, an eccentric-strap, an engaging device operatively connected with the strap and adapted to engage one of the disks when moved in one direction by the strap, means for releasing the engaging device from the disk when moved in the reverse direction, a second engaging device operatively connected with the strap and adapted to engage the second disk when moved in the opposite direction to that employed to engage the first device, means for releasing the second engaging device from the disk when moved in the reverse direction, peripheral teeth on both disks, a toothed wheel engaging the teeth on one disk, a toothed wheel engaging the teeth on the other disk, means for engaging either of these toothed wheels with the driving mechanism and simultaneously disengaging the other toothed wheel from the driving mechanism and means for holding the disk connected with the disengaged toothed wheel against rotation, as set forth.

12. In a speed-gear the combination of a driving-shaft, a disk mounted coaxially therewith and adapted to be connected with the mechanism to be driven, a variable-throw eccentric carried by the driving-shaft, an eccentric-strap, an engaging device operatively connected with the strap and adapted to engage the disk when moved in one direction by the strap, means for releasing the engaging device from the disk when moved in the reverse direction, means to control the movement of the engaging device in a path concentric with the disk, and means to prevent the eccentric-strap from rotating in the direction opposite to that in which driving is being effected, as set forth.

13. In a speed-gear the combination of a driving-shaft, a disk mounted coaxially therewith and adapted to be connected with the mechanism to be driven, an eccentric-sheave carried by the driving-shaft and slotted to permit its movement to a position of greater or less eccentricity, means to prevent the eccentric-sheave from movement in the longitudinal direction of the shaft, means for moving the driving-shaft in a longitudinal direction toward or away from the sheave, a link connecting the sheave with the driving-shaft, an eccentric-strap, an engaging device operatively connected with the strap and adapted to engage the disk when moved in one direction by the strap, means for releasing the engaging device from the disk when moved in the reverse direction, means to control the movement of the engaging device in a path concentric with the disk, and means to prevent the eccentric-strap from rotating in the direction opposite to that in which driving is being effected, as set forth.

14. In a speed-gear the combination of a driving-shaft, a disk mounted coaxially therewith and adapted to be connected with the mechanism to be driven, a sleeve on the driving-shaft, an eccentric-sheave carried by the sleeve and slotted to permit its movement to a position of greater or less eccentricity with the sleeve, means to prevent the eccentric from displacement in the longitudinal direction of the shaft, a link connecting the sleeve and eccentric, means for moving the sleeve in the longitudinal direction of the shaft, an eccentric-strap, an engaging device operatively connected with the strap and adapted to engage the disk when moved in one direction by the strap, means for releasing the engaging device from the disk when moved in the reverse direction, means to control the movement of the engaging device in a path concentric with the disk, and means to prevent the eccentric-strap from rotating in the direction opposite to that in which driving is being effected, as set forth.

In testimony whereof I have signed my name to this specification in the presence of two subscribing witnesses.

T. W. BARBER.

Witnesses:
A. M. HAYWARD,
HARRY W. BRIDGES.